(12) United States Patent
Carro

(10) Patent No.: US 6,980,202 B2
(45) Date of Patent: Dec. 27, 2005

(54) METHOD AND SYSTEM FOR CREATING AND ACCESSING HYPERLINKS FROM ANNOTATIONS RELATING TO A PHYSICAL DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 10/317,524

(22) Filed: Dec. 12, 2002

(65) Prior Publication Data

US 2003/0117379 A1 Jun. 26, 2003

(30) Foreign Application Priority Data

Dec. 21, 2001 (EP) .................................. 01480150

(51) Int. Cl.[7] .............................................. G09G 5/00
(52) U.S. Cl. ....................... 345/173; 345/104; 715/863
(58) Field of Search ................................ 345/156, 169, 345/173–180, 702, 863, 76, 82–83, 104; 178/18.01–18.11, 178/19.01–19.09; 715/702, 863

(56) References Cited

U.S. PATENT DOCUMENTS

| | | | | |
|---|---|---|---|---|
| 5,654,529 A | * | 8/1997 | Yeung et al. ............. | 178/19.03 |
| 5,850,214 A | * | 12/1998 | McNally et al. ............ | 345/173 |
| 5,929,834 A | * | 7/1999 | Inoue et al. ................ | 345/104 |
| 6,788,293 B1 | * | 9/2004 | Silverbrook et al. ........ | 345/173 |

* cited by examiner

*Primary Examiner*—Amr A. Awad
(74) *Attorney, Agent, or Firm*—Greenblum & Bernstein P.L.C.; William Steinberg

(57) ABSTRACT

A method of creating hyperlinks from annotations relating to a physical document comprises the steps of receiving a digitized handwritten annotation created with a stylus on a transparent digitizing tablet superposed on the document and transmitting the annotation to a transparent electro-luminescent display superposed on the document in order to display the handwritten annotation. It also comprises a step of storing the coordinates of a centered point of said handwritten annotation in association with said digitized handwritten annotation; and a step of receiving and storing identification and location of information associated with said coordinates.

12 Claims, 13 Drawing Sheets

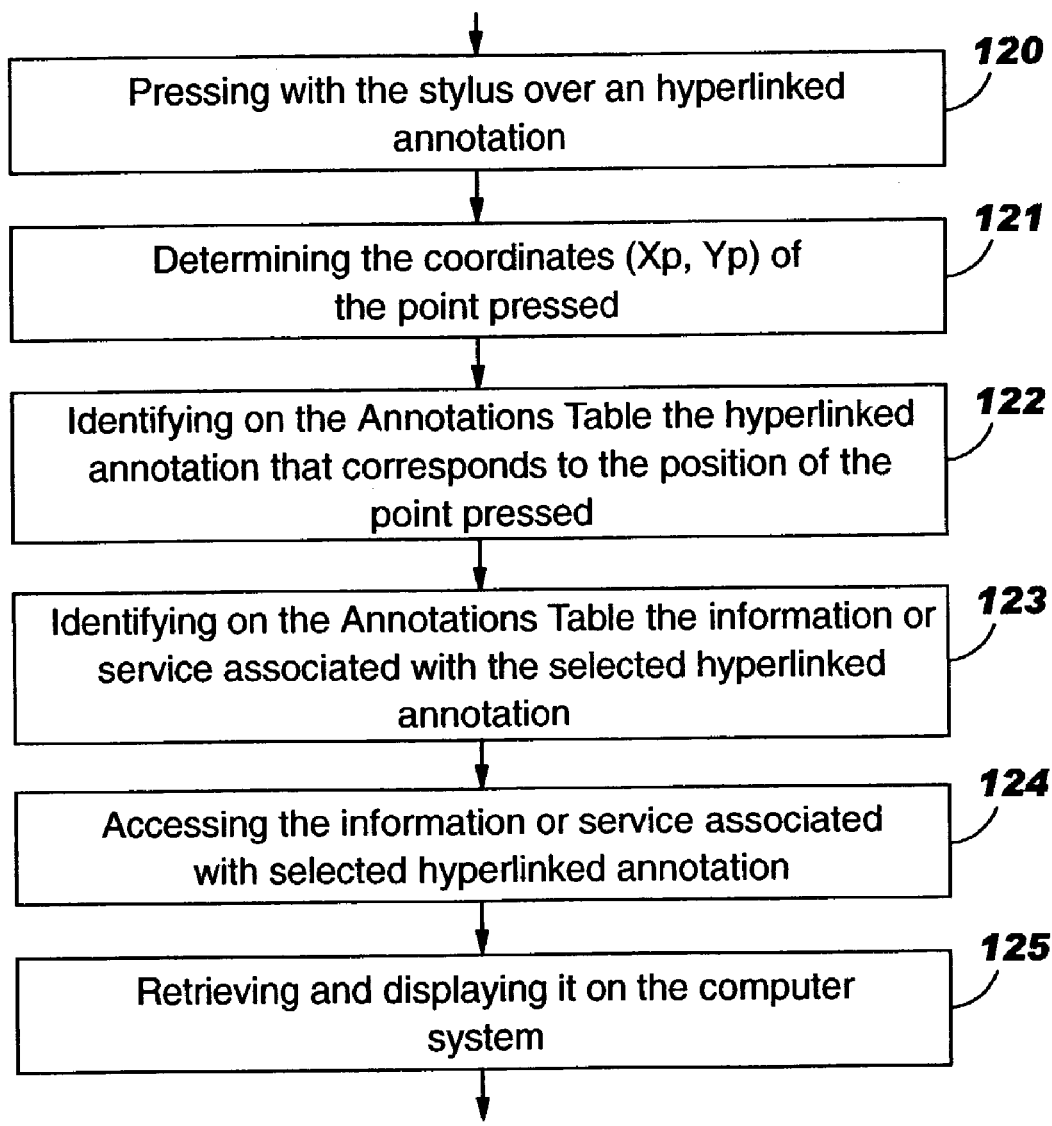

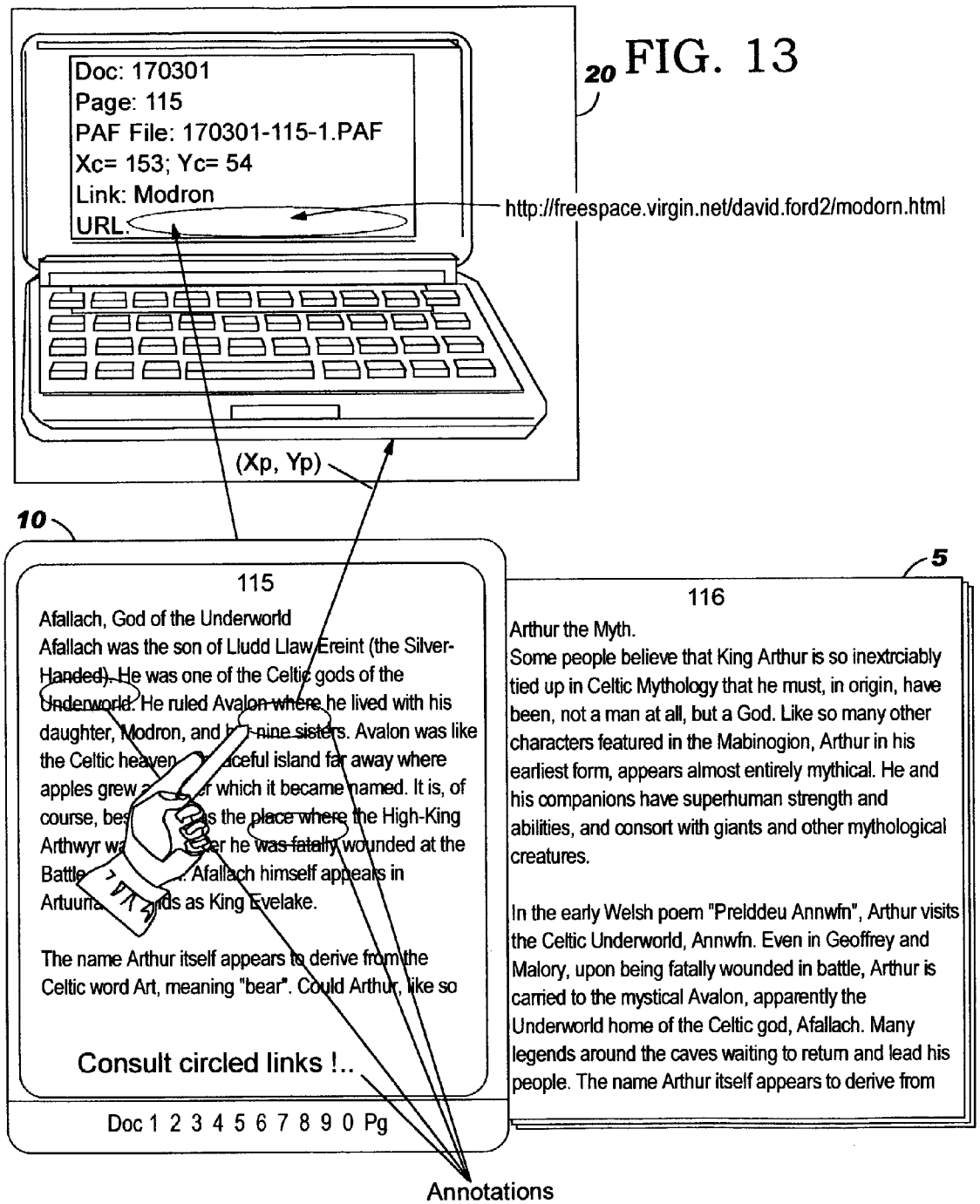

METHOD AND SYSTEM FOR CREATING AND ACCESSING HYPERLINKS FROM ANNOTATIONS RELATING TO A PHYSICAL DOCUMENT

FIELD OF THE INVENTION

The present invention generally relates to interactive computer hypermedia systems and more particularly to a method and a system of creating hyperlinks from annotations relating to a physical document in order to locally or remotely access services. It also relates to a method and a system of accessing information or services by touching hyperlinked annotations relating to the physical document.

BACKGROUND

Interactive electronic services and the World Wide Web (i.e. the Web) provide access to an increasing supply of information and services. It is known to associate hyperlinks with selected items (e.g. words, pictures, footnotes, symbols, icons) printed on hard-copy documents to locally or remotely accessible servers. However, the items that can be selected for creating hyperlinks are limited to those already printed on the original physical document. If there is a need to create hyperlinks from items (e.g. comments or annotations) not printed on the original document, then they must be marked beforehand (with physical ink), thus degrading the integrity of the original document.

SUMMARY

An object of the present invention is to overcome the above-mentioned drawbacks and to provide a new method and system for creating hyperlinks and accessing them from annotations relating to a physical document while keeping intact the integrity of the physical document.

A first aspect of the invention includes a method of creating hyperlinks from annotations relating to a physical document, comprising the following steps:
receiving a digitized handwritten annotation created with a stylus on a transparent digitizing tablet superposed on the document;
transmitting the handwritten annotation to a transparent electro-luminescent display superposed on the document in order to display the handwritten annotation;
storing the coordinates of a centered point of the digitized handwritten annotation in association with the digitized annotation; and
receiving and storing the identification and location of information or services associated with said coordinates.

By virtue of the invention, the method makes it possible to create hyperlinked annotations on physical documents, without writing on such documents.

Another aspect of the invention includes a system of creating hyperlinks from annotations relating to a physical document, comprising:
a transparent digitizing tablet;
a stylus adapted to cooperate with the transparent digitizing tablet in order to capture handwritten annotations;
a transparent electro-luminescent display; and
a computer system, where the
transparent digitizing tablet includes means for digitizing handwritten annotations created by the stylus; and the transparent electro-luminescent display includes means for displaying the handwritten annotations; and the computer system includes means for computing and storing the coordinates of a centered point of the handwritten annotations and means for receiving and storing in association with the coordinates the identification and location of information or services.

Such a system allows electronic ink annotations to be created, to be displayed over the physical document, and to be associated with services or information via hyperlinks. In a preferred embodiment of the invention, the transparent digitizing tablet is superposed on the transparent electro-luminescent display. Handwritten annotations can be simultaneously marked and displayed over a document, without physically marking the document.

According to a third aspect to the invention, a method of accessing information or services by touching hyperlinked annotations relating to a physical document, comprises the following steps:
identifying a physical document;
retrieving from an annotation table handwritten annotations relating to the physical document;
sending the handwritten annotations to a transparent electro-luminescent display superposed on the document in order to display the handwritten annotations through the transparent electro-luminescent display;
identifying at least one handwritten annotation selected with a stylus cooperating with a transparent digitizing tablet superposed on the document;
identifying and locating the information or service associated with the selected handwritten annotations in the annotation table; and
accessing the information or service.

Thus, electronic multimedia information and services can be selected and accessed by pointing to the electronic ink annotations displayed by the electro-luminescent display over the physical document they relate to.

The invention also relates in a fourth aspect, to a system of accessing information or services by touching hyperlinked annotations relating to a physical document, comprising:
a transparent digitizing tablet;
a stylus adapted to cooperate with the transparent digitizing tablet in order to select at least one handwritten annotation;
a transparent electro-luminescent display; and
a computer system comprising means for retrieving handwritten annotations from an annotation table relating to the physical document and for displaying the handwritten annotations through a transparent electro-luminescent display superposed on the document; means for identifying and locating the information or service associated with a selected handwritten annotation in the annotation table; and means for accessing the information or service.

The invention also relates to a computer program comprising computer readable instructions for carrying out the method of creating hyperlinked annotations and/or the method of accessing information or services according to the present invention.

BRIEF DESCRIPTION OF THE DRAWINGS

In the accompanying drawings, given by way of non-limiting example:

FIG. 12 illustrates an algorithm for a method of accessing information or services via hyperlinked annotation; and FIG. 13 illustrates a method for accessing information or services related to a physical document.

DETAILED DESCRIPTION

Figure 1:
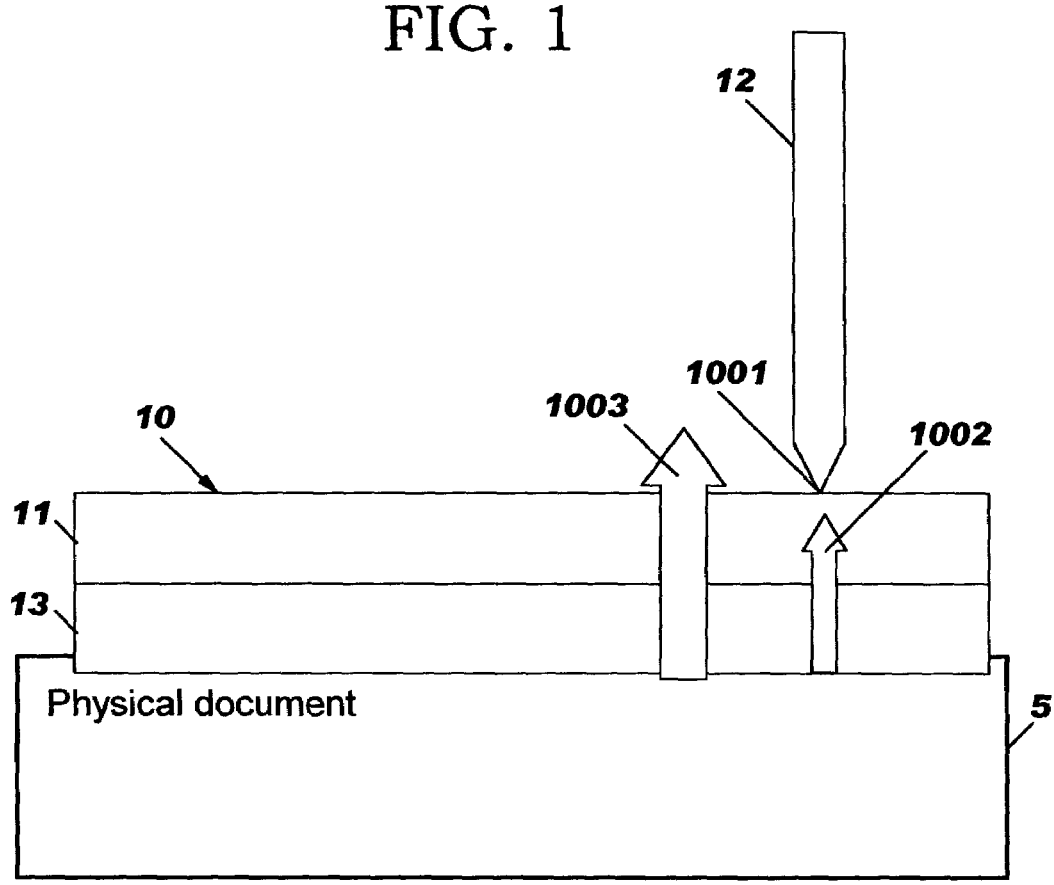
FIG. 1 is a schematic view of an apparatus for capturing and displaying handwritten annotations.

Referring first to FIG. 1, a description will now be given of an apparatus for capturing and displaying handwritten annotations over a document 5. This apparatus 10 comprises a transparent digitizing tablet 11 adapted to cooperate with a stylus 12 in order to capture handwritten annotations. Such a transparent digitizing tablet 11 is commonly used to generate signals that are proportional to the coordinates of each point pressed by the stylus 12. Digitizing tablet 11 and stylus 12 can be considered as electronic equivalents of pencil and paper used for writing, drawing, tracing or sketching.

In a preferred embodiment of the invention, the digitizing tablet may be built from a substrate having a matrix formed by a plurality of first and second lines used to determine the position of the stylus 12 when applied to the tablet. The first lines correspond to a plurality of scanning lines and the second lines correspond to a plurality of data lines. These first and second lines are made from a transparent conductive material, for example from indium tin oxide (ITO). The application of the stylus to the tablet creates an electric signal, the succession of electric signals corresponding to a drawing on the tablet. An example of transparent digitizing tablets suitable for implementing the present invention is produced by Wacom Technology Co. and sold under the name Wacom, PL Series, LCD pen tablet system. Such a tablet is used with a pen-like stylus. An example of a suitable stylus is Wacom's wireless, pressure sensitive UltraPen sold by Wacom Technology Co.

According to the invention, the apparatus further comprises a transparent electro-luminescent display 13 adapted to display captured handwritten annotations. This display 13 is of the type of a transparent organic bright light-emitting device. In a preferred embodiment of the present invention, the display 13 comprises a substrate having an array or a mesh formed by a plurality of first and second lines. The first lines correspond to transparent scanning lines and the second lines correspond to transparent data lines. These first and second lines cross one another and an electro-luminescent element is located at each intersection of the scanning and data lines.

Such a light-emitting display, with a passive matrix, may be made of an array of Transparent Organic Light Emitting Devices (TOLED's) which are commonly used to create vision area displays on windshields, cockpits, and so forth. TOLED are today manufactured with standard silicon semiconductors. An example of light emitting foil technology it would be possible to use here is that used for the TOLED's manufactured by Universal Display Co.

In its basic form, a TOLED is a monolithic, solid-state device consisting in a series of molecules of small size forming organic thin films sandwiched between two transparent, conductive layers. When a voltage is applied across the device, it emits light. This light emission is based upon a luminescence phenomenon wherein electrons and holes are injected and migrate from the contacts toward the organic junction under the applied electric field. When these carriers meet, they form excitons (electron-hole pairs) that recombine radiatively to emit light. As a result, TOLED's are bright and can be directed to emit from either or both surfaces of the sheet. This is possible because, in addition to the transparent contacts, the organic materials are also transparent over their own emission spectrum and throughout most of the visible spectrum. Moreover, TOLED displays can be nearly as clear as glass, since they can be up to 85% transparent when not energized.

As shown on FIG. 1, the transparent digitizing tablet 11 is superposed on the transparent electro-luminescent display 13. Thus, the apparatus comprises two superposed, functionally independent transparent foils. This apparatus provides in a portable transparent electro-luminescent digitizing tablet 10 which can be superposed on any kind of physical document.

A shown in FIG. 1, the electro-luminescent display 13 is adapted to emit light at the point 1001 that is pressed by the stylus (see the arrow 1002). Since the digitizing tablet superposed thereon is transparent, the light emitted by the display is transmitted through the tablet in order to appear on the top of the apparatus 10. Moreover, since this display is transparent, it is also adapted to transmit light (see the arrow 1003) from the physical document through both the display 13 and the tablet 11, so that the surface of the physical document is visible on unmarked areas. Consequently, such an apparatus is perfectly adapted to write annotations in "electronic ink" and to display these annotations over the document, without physically marking the document.

Figure 2:
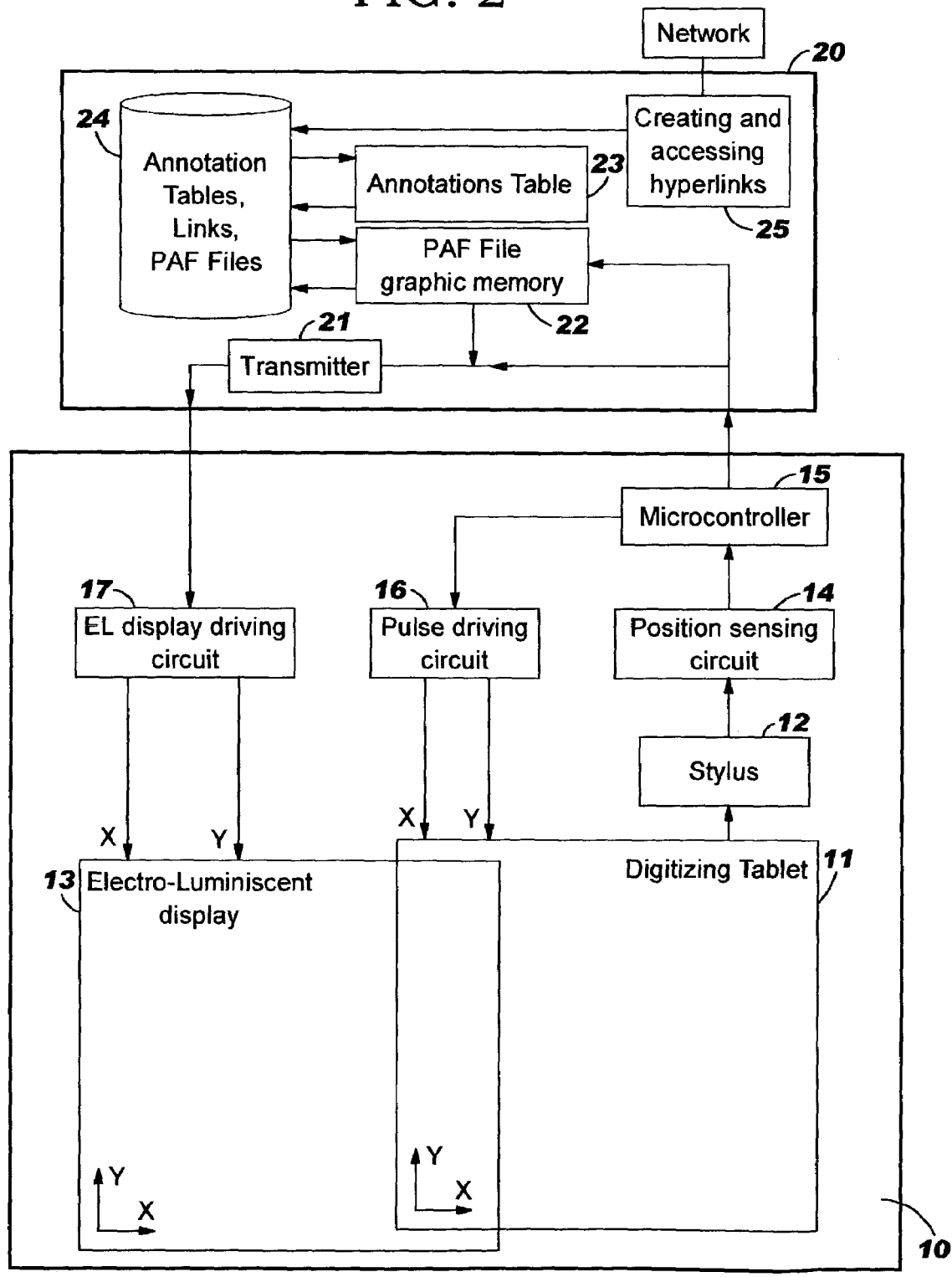
FIG. 2 is a block diagram illustrating a system for capturing and displaying handwritten information.

As shown in FIG. 2, this apparatus 10 is used with a computer system 20. This computer system 20 can be a personal computer, an Internet enabled cell phone, a Personal Digital Assistant, an onboard computer, a network computer, an Internet appliance or a wireless IP enabled device. The apparatus 10 can communicate with the computer system 20 over an infrared link, a serial wired connection or any other communication means. The apparatus 10, the stylus 12 and the computer system 20 thus constitute a system for capturing and displaying electronic handwritten annotations.

The apparatus 10 comprises means 14 for digitizing annotations made by the stylus 12 and means 15 for sending digitized annotations to the computer system 20. In practice, a pulse driving circuit 16 alternately transmits driving pulses to the X- and Y-axis directions of the digitizing tablet 11 for sensing the current position of the stylus 12. The pulse driving circuit 16 is controlled by the microcontroller 15. The position of the stylus 12 is detected by capacitive coupling sensed in the digitizing tablet 11, that is the stylus 12 senses a position signal in a potential distribution on the digitizing tablet 11 using capacitive coupling, and provides the position to the digitizing means 14 which is referred to as a position sensing circuit 14. This position sensing circuit 14 receives the current X- and Y-axis coordinate data of the stylus 12 and converts the coordinate date into digitized position data. The micro-controller 15 transfers data of the position detected from the position sensing circuit 14 to the computer system 20. Thus, the micro-controller 15 is used for sending digitized annotations to the computer system 20. Upon reception of position data from the position sensing circuit 14, the micro-controller 15 analyses the position data to calculate the current position of the stylus and updates the computer system 20.

The computer system 20 comprises means 21 for transmitting digitized annotations to the transparent electro-luminescent display 13 of the apparatus 10. Thus the data of the position of the stylus 12 is directly transmitted by the computer system 20 to an electro-luminescent display driving circuit 17 controlled by the computer system 20. The electro-luminescent display driving circuit provides X-, and Y-axis coordinate driving signals to the electro-luminescent display 13 so that the latter can display the pixel on which is positioned the stylus through the transparent tablet 11.

The computer system 20 also comprises means 22,23,24 for storing digitized annotations sent by the transparent digitizing tablet 11. It also comprises means 25 for creating hyperlinks from selected annotations to locally or remotely access information or services. As described in detail in the following description, in reference to the method performed by the system, the storing means 22, 23, 24 are adapted to store digitized annotations associated with a reference to a physical document which is used in relation with the apparatus 20 and the creating means 25 are adapted to associate service or information with an annotation over the selected physical document. The system 10, 20 described above can stand alone or can be connected to other similar systems via a conventional communication network. Here, the computer system 20 is connected to the Internet network and comprises a web browser application used in a known manner to access remote information or services on the Internet network. Servers are web servers and the information or services are web pages.

Figure 4:
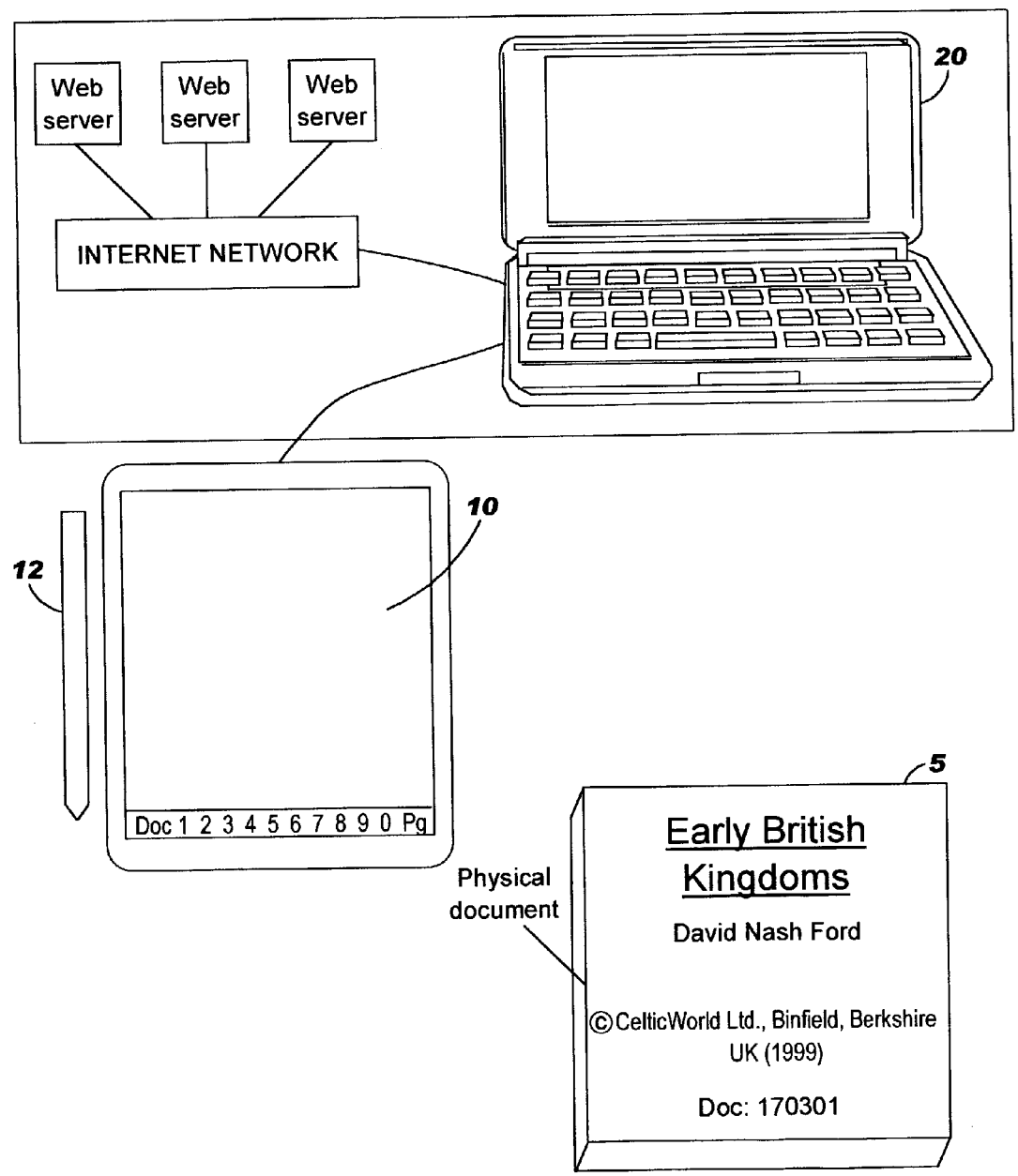
FIGS. 4 to 6 illustrate the method for capturing and displaying handwritten annotations over a physical document.

As illustrated on FIG. 4, the apparatus 10, connected to the computer system 20 is used to create annotations relating to a physical document. Here, the document to be annotated is a book of several pages, entitled "Early British Kingdoms". Any kind of document can be used, and for example, geographic maps, technical plans, commercial catalogs or even any other type of hard-copy, engraved, written or printed surfaces. The physical document could also be a blank paper sheet or a printed form to be filled in. The material of the physical documents can be paper, plastic, wood or any other material.

Figure 3:
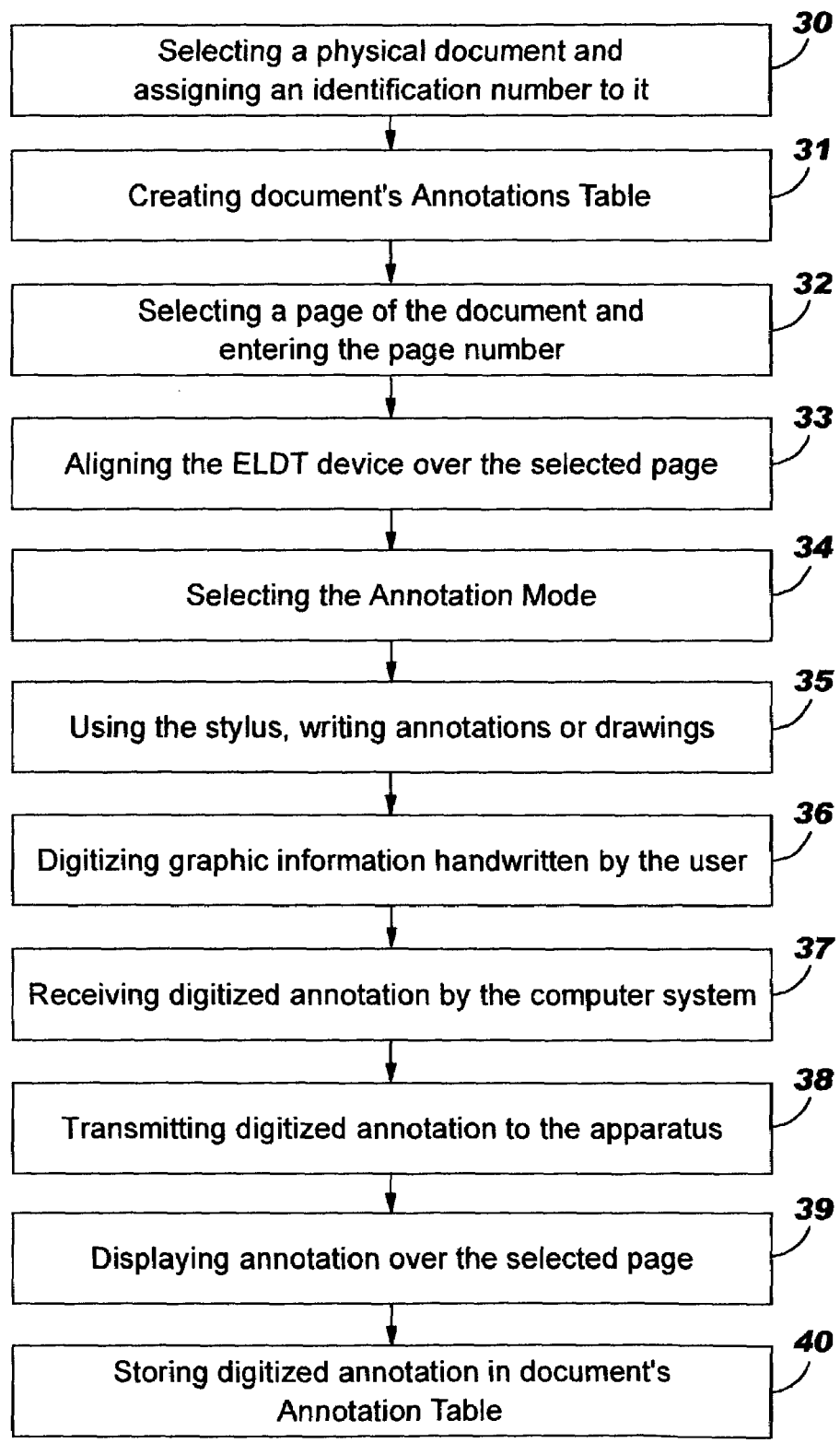
FIG. 3 illustrates an algorithm for a method of capturing and displaying handwritten information.
Figure 5:
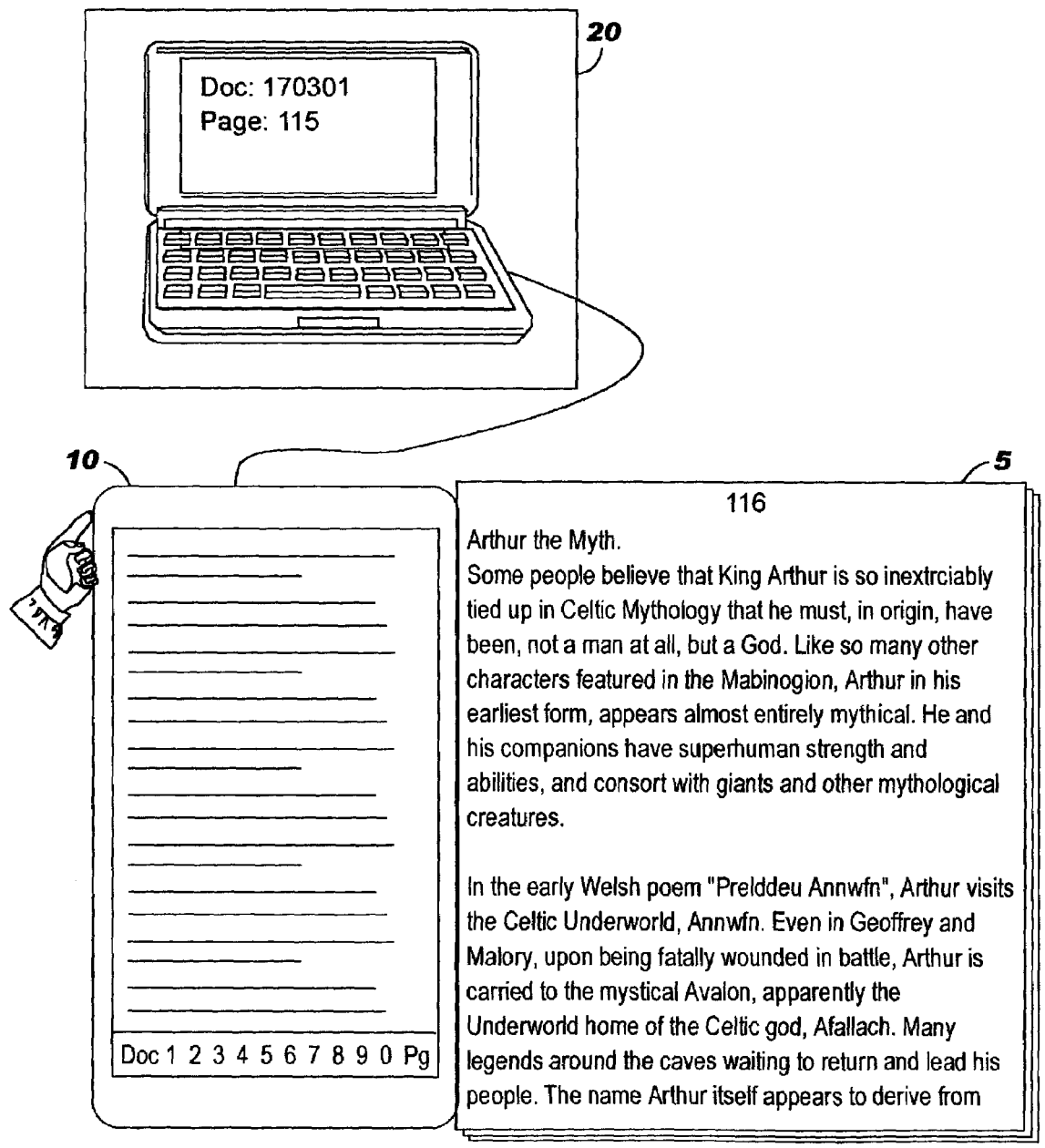

As shown on the embodiment of FIG. 3, the method comprises first a step 30 of selecting a physical document and assigning an identification number to it. Here, the identification number is a reference, such as Doc: 170301, which can be written on the document, for example on the first page of the book. A document's annotation table is then created in a creating step 31. As shown on FIG. 5, the annotation table 24 is created on the computer system 20. It comprises the reference number of the document and possibly, other relevant information related to the document such as the title, author, ISBN (International Standard Book Number), date, and so forth. Here, the annotation table 24 is stored within the computer system 20. It could also be stored in an external memory accessible from the computer system 20.

In a selecting step 32, a page of the document, here the page 115, is selected and entered in the annotation table. This step corresponds to opening a new page entry on the annotation table. An aligning step 33 is then performed wherein the apparatus 10 comprising digitizing tablet 11 and electro-luminescent display 13 in a stack superposed over the selected page of the document. This location of the apparatus is clearly shown in FIG. 5. Since the apparatus comprises superposed sheets that are both transparent, the page of the document underneath the apparatus can be read through the apparatus 10. Preferably, the apparatus 10 is aligned with the borders of the page by some conventional means, for example by adjusting the upper left corner of the page with the upper left corner of the apparatus 10.

A selection step 34 is performed to select an Annotation mode. This selection can be made by means of a dedicated functional key available on the keyboard of the computer system 20. The apparatus 10 is then ready to capture handwritten annotations.

Figure 6:
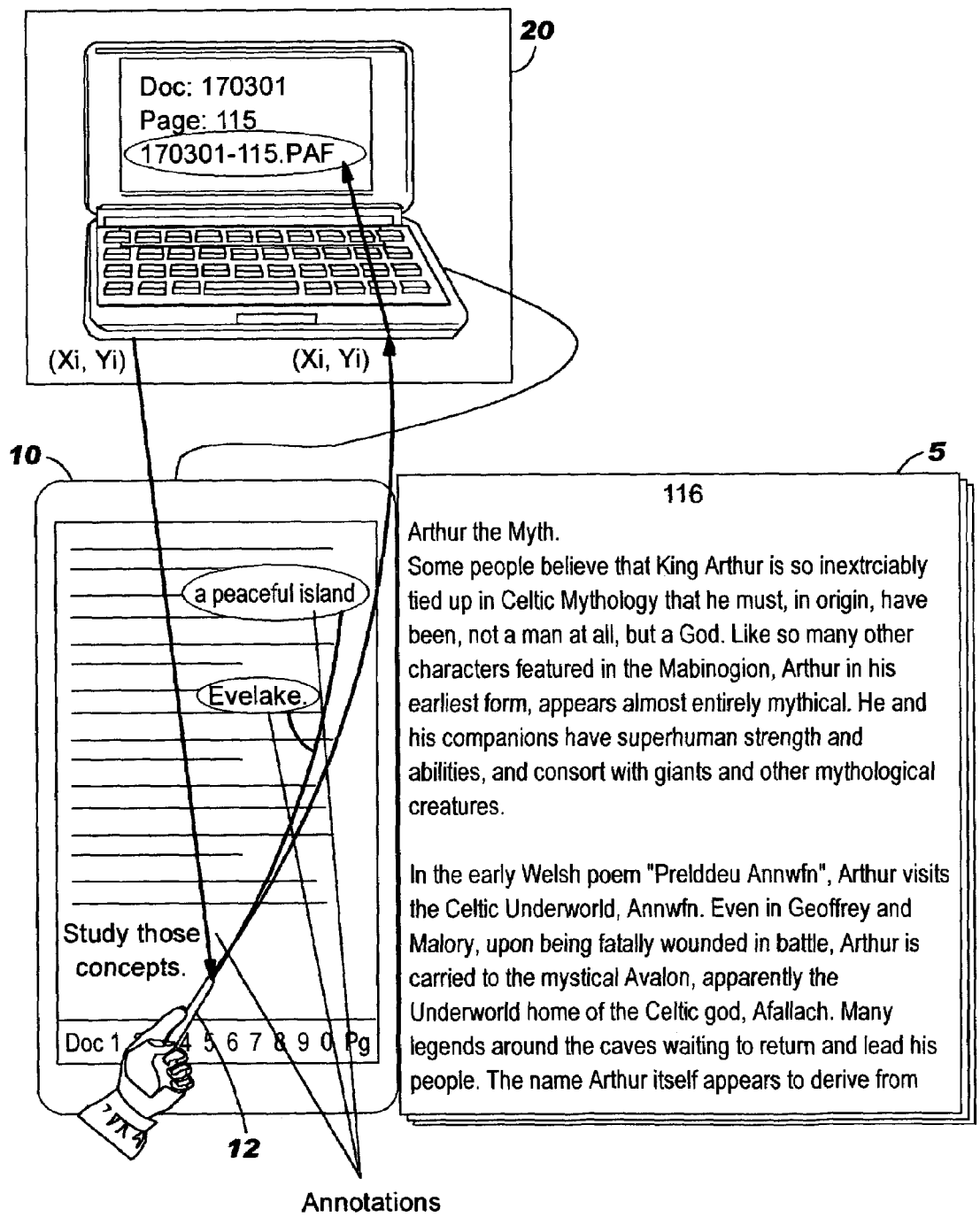

A writing step 35 is then performed by using the stylus 12 as shown in FIG. 6, in order to create annotations relating to the document. Any type of annotations (marks, texts, drawing, underlines, and so forth) can be handwritten by the stylus 12 on the digitizing tablet 11 of the apparatus 10. These annotations made by a user can be directly related to the content of the page seen through the apparatus 10 by virtue of its transparency.

A digitizing step 36 is adapted to digitize annotations made by the stylus 12 on the transparent digitizing tablet 11. In practice, as illustrated in FIG. 6, the digitizing tablet 11 takes samples, digitizes the sequence Xi, Yi of coordinates of each point pressed by the stylus 12 on the tablet 11 and sends this sequence to the computer system 20. The succession of sequences of coordinates thus constitute a digitizing annotation sent to the computer system 20 and received by the computing system during a receiving step 37.

Under control of the same computer system 20, the sequence of coordinates Xi, Yi are transmitted, i.e. sent back, to the apparatus 10, and more precisely, to the transparent electro-luminescent display 10. This transmitting step 38 is adapted to transmit digitized annotations in order to further highlight the digitized annotations during a displaying step 39. In practice, each of the point coordinates Xi, Yi received by the electro-luminescent display is decoded and the corresponding row and column drivers of the matrix of passive electro-luminescent elements become active. When active, the element (or pixel) located at the intersection of the selected row and column emits light. Only the electro-luminescent elements corresponding to the stylus strokes sensed by the digitizing tablet 11 must be continuously scanned and refreshed by the computer system 20. Unmarked areas of the apparatus 10 remain transparent, while only the areas marked by the stylus 12 are highlighted in order to display annotations made by the user directly over the selected page of the document, without physically marking this page. Thus, the method described above permits the entering and displaying of annotations simultaneously.

According to the preferred embodiment described here, the method further comprises a step 40 of storing, in the annotation table 24 stored in the computer system, digitized annotations sent by the apparatus 10. FIG. 6 shows how the sequence Xi, Yi of point coordinates, corresponding to stylus strokes is stored on the computer system 20, as a "Page Annotation File" (.PAF). that encodes the graphic information of the annotations made by the user. Once created, this .PAF file is referenced in the document's annotation table, associated with the selected document's page. In this embodiment, the name of the file to be referenced is composed of the document's reference (here 170301) followed by the page number (here 115).

As an example, the annotation table associated with a document after annotating one page (for example page 115) would be as follows:

| Doc: 170301 | Title: "Early British Kingdoms"<br>Date: Jan. 28, 2000 | Author: David Nash Ford of Binfield, Berkshire, UK<br>ISBN: 84-344-0856-2 |
|---|---|---|
| Pg: 115 | File: 170301-115-001.PAF | |
| Pg: 115 | File: 170301-115-002.PAF | |
| Pg: 115 | File: 170301-115-003.PAF | |
| Pg: 115 | File: 170301-115-004.PAF | |

Thus, the annotation table comprises for each page of the document several annotation files (.PAF files) for encoding respectively several annotations associated with the page.

Figure 7:
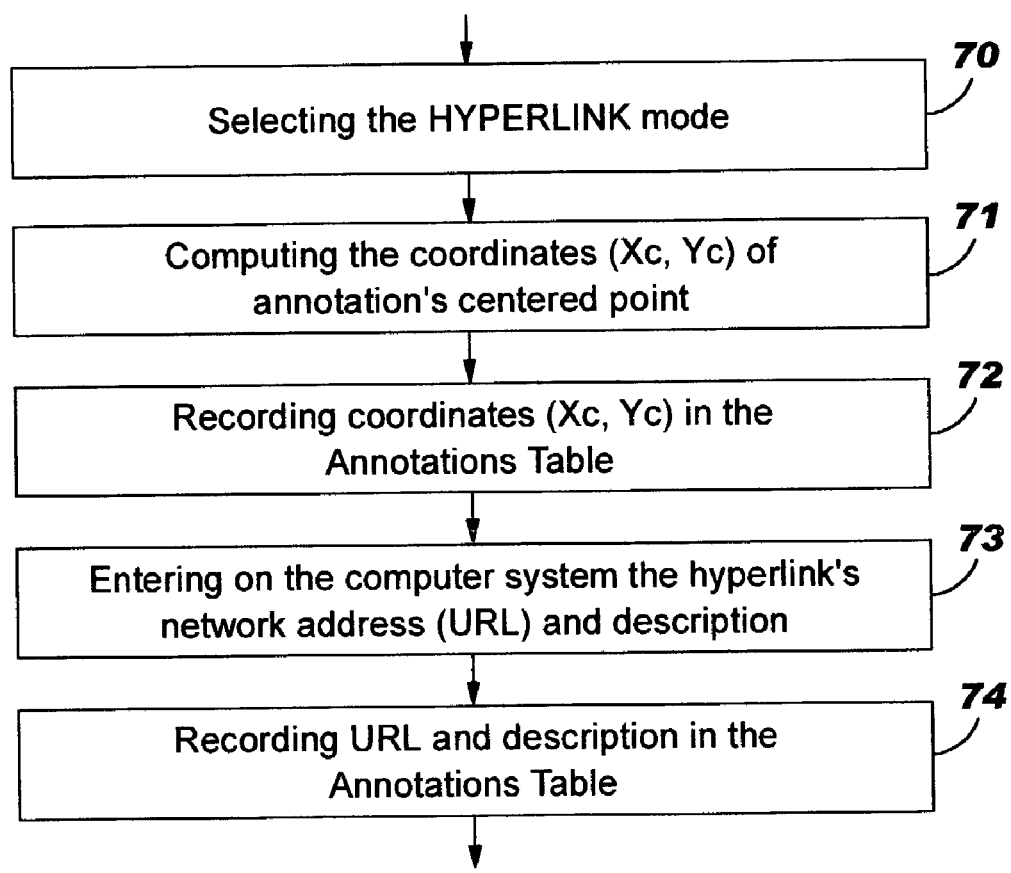
FIG. 7 illustrates an algorithm for a method of creating hyperlinks according to a first aspect of the invention.
Figure 8:
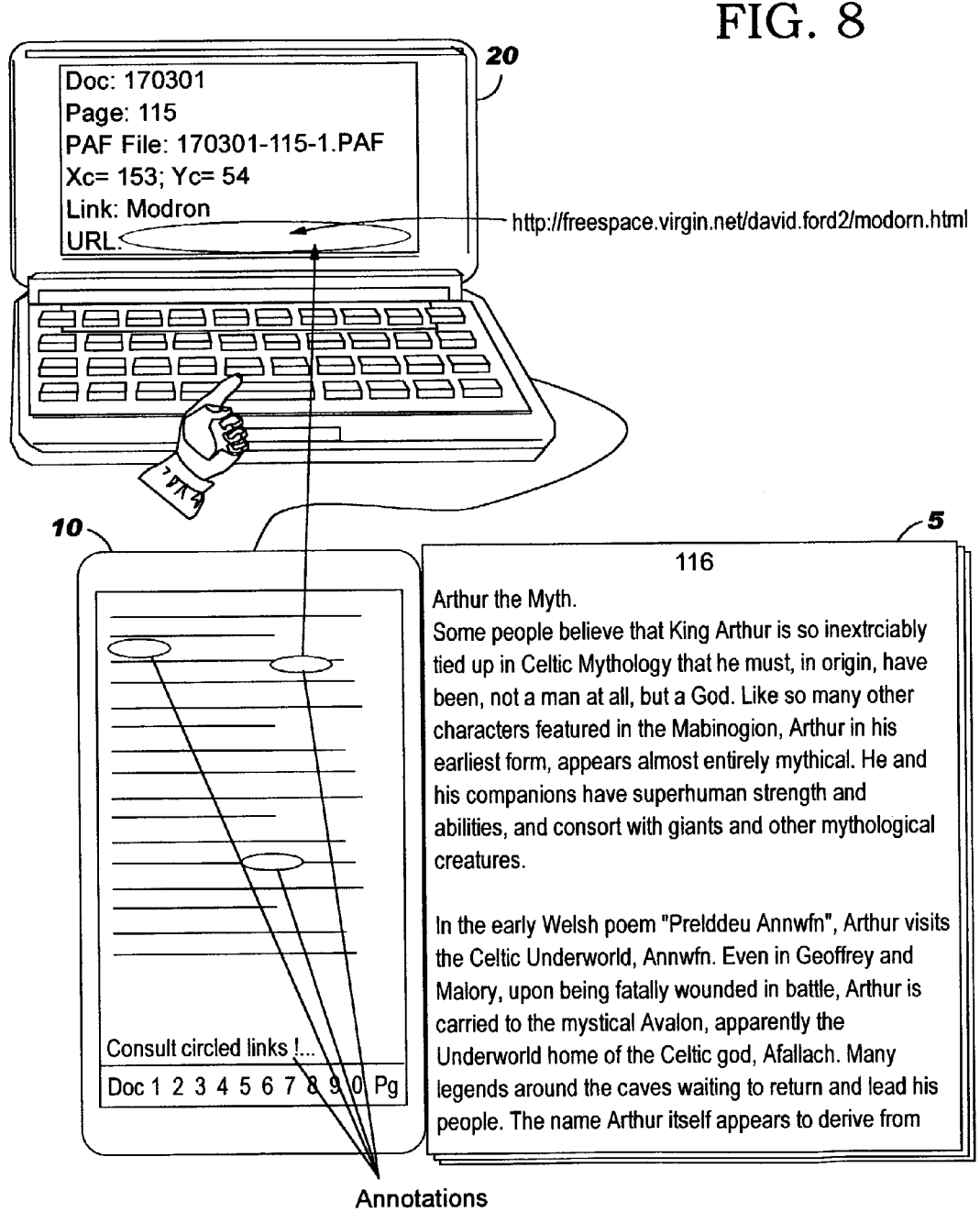
FIG. 8 illustrate the method for creating hyperlinks over a physical document.

According to the present invention a method of creating hyperlinks from annotations will be now described with reference to FIG. 7. This method comprises first a step 70 of selecting a hyperlink mode. This selection can be made by means of a dedicated functional key available on the keyboard of the computer system 20. The apparatus 10 is then ready to create hyperlinks relating to an annotation displayed on the transparent electro-luminescent display 13 superposed on the selected page of the document. Next, a computing step 71 is performed, wherein the coordinates Xc, Yc of a centered point of the annotation are computed from the associated annotation file (PAF.file). The computing of these coordinates is made relative to conventional coordinate references of the apparatus 10, i.e. of the tablet 11 superposed to the display 13. As shown in FIG. 8, the centered point of an annotation corresponds to a centered point of a rectangle surrounding the annotation (here the annotation is a circle made around a word "Modron" printed on the selected page of the document). These coordinates Xc, Yc are then recorded during a recording step 72 on the corresponding page annotation entry in the annotation table associated to the document.

As shown in FIG. 8, here the coordinates Xc=153 and Yc=54 are the coordinates of the geometric centered point of the annotation corresponding to the file 170301-115-001.PAF. The coordinates of the centered point are thus stored in association with the digitized handwritten annotation.

Next, a receiving step 73 is adapted to enter the hyperlink's network address and preferably a short description of the link on the computer system. Thus, the annotation is associated with a destination address (an Internet URL address for example) which identifies a server connected to the communication network and the information and/or services within this server the user wants to access from the annotation. A recording step 74 is then performed to record the address URL and optionally a description of the associated hyperlink, with the corresponding entry of the annotation table of the document. In FIG. 8, the hyperlink named "Modron" has been defined through the URL address http://freespace.virgin.net/david;ford2/modron.html.

Several types of multimedia services can be defined in the annotation table using different types of codes, for example to access a URL address or to make a telephone call. Of course, the hyperlinks can be created in turn for each respective annotation as it is stored in the annotation table, or alternatively, all the annotations relative to a physical document can be stored in the annotation table before the hyperlinks are created in association with selected annotations. When the method of creating hyperlinks is performed on a page of the physical document (for example page 115), the annotation table would be as follows:

| Doc: 170301 | Title: "Early British Kingdoms"<br>Date: Jan. 28, 2000 | | Author: David Nash Ford of Binfield, Berkshire, UK<br>ISBN: 84-344-0856-2 |
|---|---|---|---|
| Pg: 115 | File: 170301-115-001.PAF<br>Link: Modron | Xc = 153; Yc = 54<br>URL: http://freespace.virgin.net/david.ford2/modron.html | |
| Pg: 115 | File: 170301-115-002.PAF<br>Link: Afallach | Xc = 19; Yc = 27<br>URL: http://freespace.virgin.net/david.ford2/gods.html#Afallach | |
| Pg: 115 | File: 170301-115-003.PAF<br>Link: Beli Mawr | Xc = 47; Yc = 132<br>URL: http://freespace.virgin.net/david.ford2/gods.html#Beli | |
| Pg: 115 | File: 170301-115-004.PAF<br>Link: | Xc = ; Yc =<br>URL: | |

Thus, in the above example, four annotations are associated with page 115, three of them being hyperlinked.

A method for retrieving and displaying electronic handwritten annotations on a physical document and accessing information or services associated with the annotations is now described with reference to FIGS. 9 to 13. The retrieving method can be performed by the same user as the one who has made the annotations over the document or by another user from a computer system memorizing the annotation table associated with the document.

Figure 9:
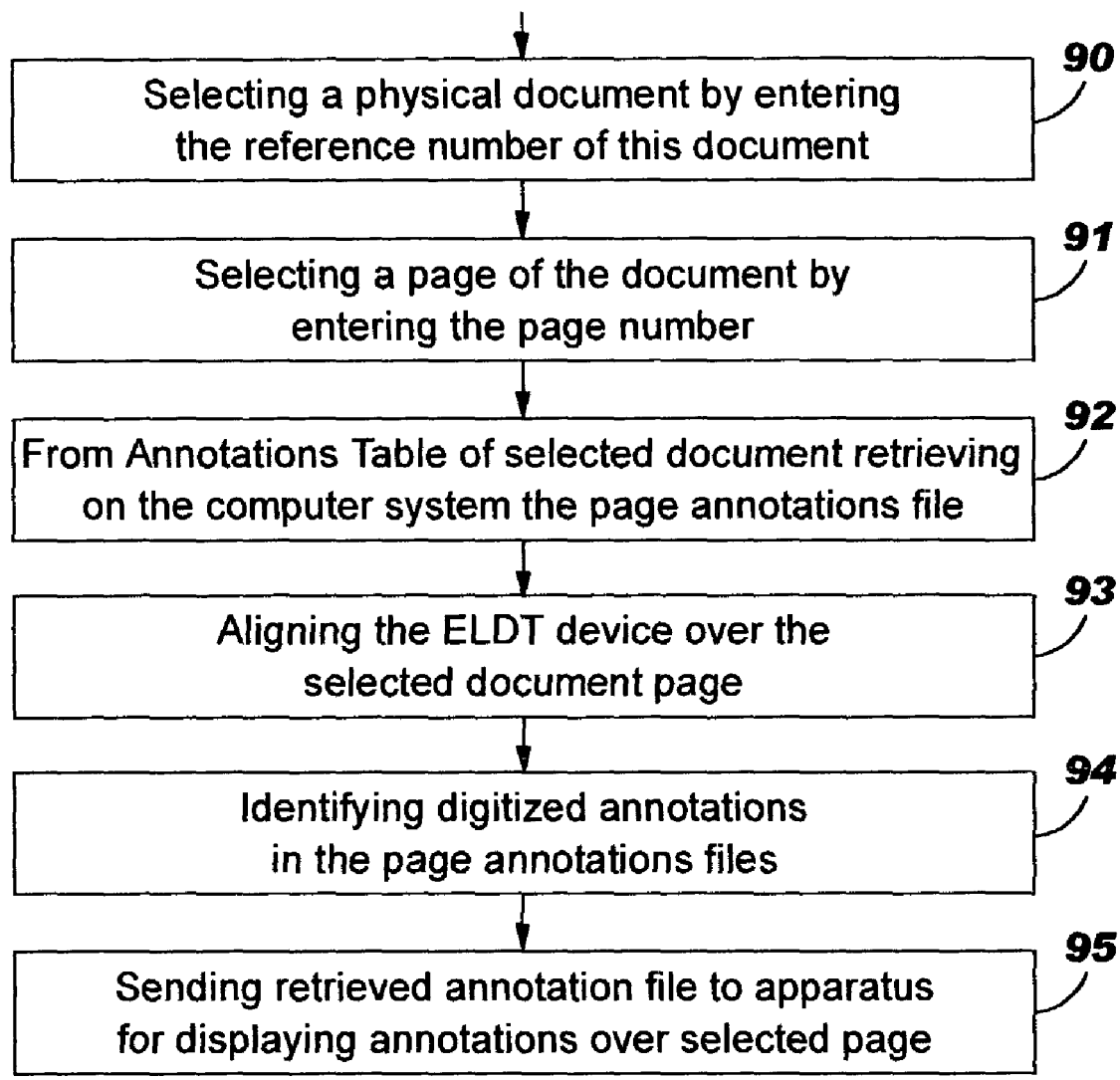
FIG. 9 illustrates an algorithm for a method of retrieving and displaying handwritten information.
Figure 10:
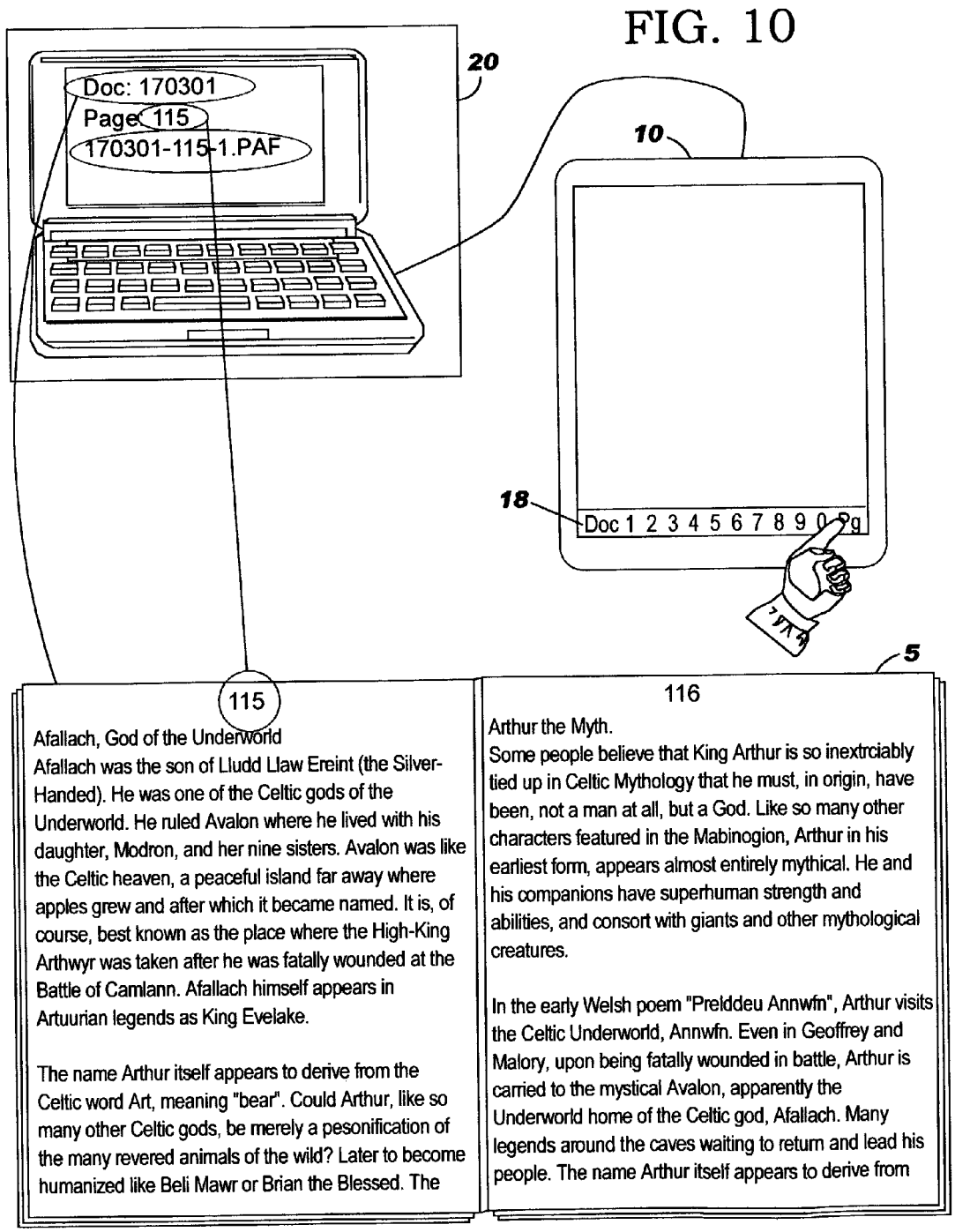
FIGS. 10 and 11 illustrate a method for retrieving and displaying handwritten information on a physical document.

As shown in FIG. 9, the method of retrieving and displaying annotations comprises first a step for identifying a physical document. In practice, a first selecting step 90 is adapted to select a physical document by entering a reference number of this document. The user can enter, by means of any interface (keyboard, mouse, etc.) the reference number, here Doc: 170301. As shown in FIG. 10, the apparatus 10 comprises here an array 18 of buttons, preferably touch sensitive, printed on a dedicated touch pad area of the apparatus, directly on the digitizing tablet 11. The user enters the reference of the physical document via a button marked "Doc" and number buttons. When this reference entered in the apparatus is transmitted via the microcontroller 15 to the computer system 20, the latter retrieves the annotation table associated with the selected document.

Next, a second selecting step 91 is performed to identify a page of the physical document, for example the page 115 of the book under consideration. The entering of the number of the page can be made as described above, via the button area 18. The number of the page is transferred from the apparatus 10 to the computer system 20 via the microcontroller 15. In a retrieving step 92 the computer system identifies the page annotation file (e.g. 170301-115.PAF) of the selected page within the annotation table associated with the selected document.

Figure 11:
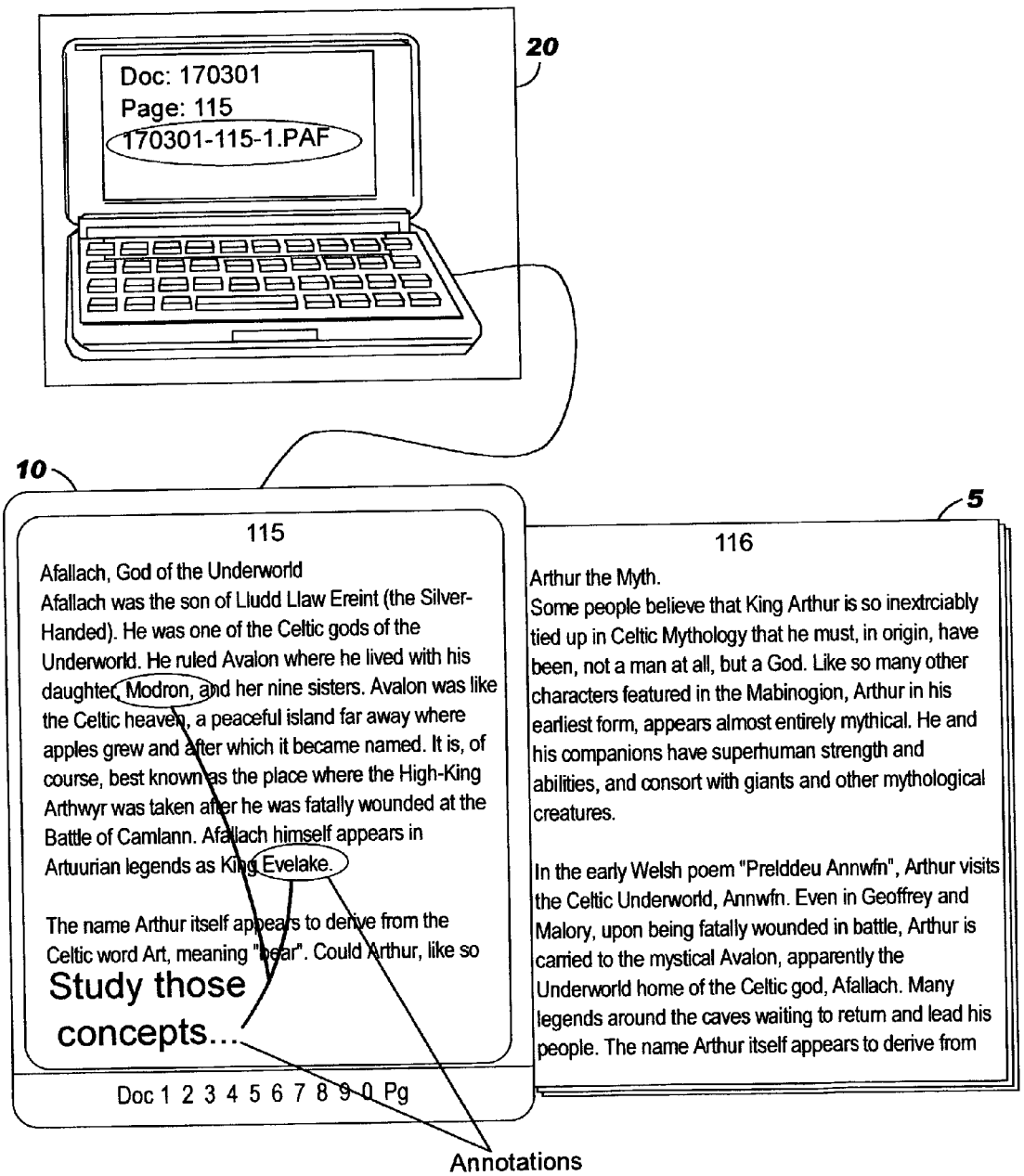

During the selecting step 90 and 91 and the retrieving step 92, the apparatus 10 can be disposed in any way vis-a-vis the physical document. An aligning step 93 is then performed for aligning the apparatus 10 over the selected document page. This step is shown in FIG. 11. The upper left corner of the apparatus 10 can be adjusted in a conventional manner with the upper left corner of the page. Thanks to the transparency of the apparatus 10, the user can see the content of the selected document page through the apparatus 10.

Next, a step 94 of identifying digitized annotations stored in the page annotation file is performed. In fact, in the page annotation file, all the annotations made previously over the page of the document are encoded as graphic information. Next, during a sending step 95, the computer system 10 sends the retrieved annotations to the apparatus 10 for displaying the annotations via the transparent electro-luminescent display 13. Consequently, the annotations that have been made by the user or by another user, are displayed by the apparatus 10 directly over the physical document, without marking it.

With reference to FIG. 12, the method of accessing information or services by touching hyperlinked annotations according to the invention will be now described. After identifying the physical document, retrieving handwritten annotations and displaying these handwritten annotations through the transparent electro-luminescent display 13 superposed on the selected page of the document, a step 120 is performed of selecting one handwritten annotation with the stylus 12 cooperating with the transparent digitizing tablet 11 superposed on the document. In practice, the user presses with the stylus 12 over a hyperlinked annotation displayed by the display 13. The apparatus 10 sends a signal to the computer system 20 to identify the selected annotation. This signal indicates the position on the page of the point that has been pressed by the stylus. The generated signal is proportional to the coordinates Xp, Yp of this pressed point. As shown in FIG. 13, the pressed point is located not too far from the computed centered point of the annotation.

Next, an identifying and locating step 121, 122, 123 of the information or service associated with the selected handwritten annotation is performed. As shown in FIG. 13, the coordinates Xp, Yp of the pressed point are determined in a determining step 121. An identifying step 122 is adapted to identify in the annotation table the hyperlinked annotation that corresponds to the position of the point pressed on the apparatus 10 by the stylus 12. In practice, the coordinates Xp, Yp of the point pressed by the stylus are compared with the coordinates Xc, Yc of the centered point of the handwritten annotations stored in the annotation table, in order to identify the coordinates Xc, Yc the closest to the coordinates Xp, Yp of the pressed point. These identified coordinates Xc, Yc correspond to a specific annotation in the annotation table. Here, the pressed point corresponds to the hyperlinked item "Modron" in the annotation table. The annotation table is either stored locally in the computer system 20, or is retrieved from a remote server of the communication network. As soon as the annotation has been identified in the annotation table, the information or services associated can be identified in an identifying step 123 via the address URL stored in the annotation table. An accessing step 124 is adapted to access the information or service associated with the selected hyperlinked annotation and a retrieving step 125 is performed to retrieve and display on the computer system the information or service, i.e. a web page of a server connected to the communication network.

The present invention is adapted to associate hyperlinks with selected annotations made over a physical document, without degrading it and to retrieve and display any one of the hyperlinks only by pressing with a stylus on a corresponding annotation. The hyperlinks can be associated by a first user over his copy of a physical document and be retrieved and displayed by a second user via the same copy or another copy of the physical document. The annotation table comprising annotation files and hyperlinks associated can be accessible through the communication network by any user computer system connected to the network.

The above-described methods can be performed by microprocessors incorporated respectively in the apparatus 10 and the computer system 20. The computer system 20 comprises also a Read Only Memory storing a computer program comprising computer readable instructions for carrying out the method for capturing and displaying handwritten annotations, creating hyperlinks associated with an annotation, for retrieving and displaying handwritten annotations on the apparatus 10 and for retrieving and displaying information or services via hyperlinks on the computer system 20. The computer system 20 comprises a Random Access Memory adapted to store the modified parameters when the program is run, such as the Page Annotation Files associated with each selected physical document. The computer program could also be stored on a hard disk of the computer system 20 or in a movable storage means such as a diskette or a CD-ROM which can be read by a reader incorporated in the computer system 20.

Persons skilled in the art will recognize that many variations of the teachings of this invention can be practiced that still fall within the claims of the invention which follow.

I claim:

1. A method of creating hyperlinks from annotations relating to a physical document, comprising the steps of:
   receiving a digitized handwritten annotation created with a stylus on a transparent digitizing tablet superposed on the document;
   transmitting said digitized handwritten annotation to a transparent electro-luminescent display superposed on the document in order to display the handwritten annotation;
   storing coordinates of a centered point of said digitized handwritten annotation in association with said digitized handwritten annotation;
   receiving and storing identification and location of information associated with said coordinates; and
   creating an annotation table for the physical document, said annotation table comprising for each digitized handwritten annotation, coordinates of a centered point of said handwritten annotation and identification and location of information associated with said handwritten annotation.

2. The method according to claim 1, further comprising a step of storing handwritten annotations in association with a reference to the physical document.

3. The method according to claim 1, characterized in that the step of receiving and storing the identification and location of information comprises a step of storing a destination address in a communication network where said information associated with said handwritten annotation can be accessed.

4. A computer program comprising computer readable instructions for carrying out the method according to claim 1.

5. A system of creating hyperlinks from annotations relating to a physical document, comprising:
   a transparent digitizing tablet;
   a stylus adapted to cooperate with the transparent digitizing tablet in order to capture handwritten annotations;
   a transparent electro-luminescent display; and
   a computer system, wherein
   said transparent digitizing tablet comprises means for digitizing handwritten annotations created by stylus;
   said transparent electro-luminescent display comprises means for displaying said handwritten annotations;
   and said computer system comprises means for computing and storing coordinates of a centered point of the handwritten annotations and means for receiving and storing in association with said coordinates identification and location of information, and further comprising an annotation table for each physical document, said annotation table comprising for each digitizing handwritten annotation, coordinates of a centered point of said handwritten annotation and identification and location associated with said handwritten annotation.

6. The system according to claim 5, wherein the transparent digitizing tablet is superposed on the transparent electro-luminescent display.

7. The system according to claim 5, wherein said annotation table stores a destination address in a communication network where said information associated with said handwritten annotation can be accessed.

8. A method of accessing information or services by touching hyperlinked annotations relating to a physical document, comprising the steps of:
   identifying a physical document;
   retrieving from an annotation table handwritten annotations relating to said physical document, said annotation table providing for each digitizing handwritten annotation, coordinates of a centered point of said handwritten annotation and identification and location of information associated with said handwritten annotation;
   sending said handwritten annotations to a transparent electro-luminescent display superposed on the document in order to display said handwritten annotations through said transparent electro-luminescent display;
   identifying at least one handwritten annotation selected with a stylus cooperating with a transparent digitizing tablet superposed on the document;
   identifying and locating the information or service associated with said selected handwritten annotations in the annotation table; and
   accessing said information or service.

9. A computer program comprising computer readable instructions for carrying out the method according to claim 8.

10. A method of accessing information or services by touching hyperlinked annotations relating to a physical document, comprising the steps of:
    identifying a physical document;
    retrieving from an annotation table handwritten annotations relating to said physical document;
    sending said handwritten annotations to a transparent electro-luminescent display superposed on the document in order to display said handwritten annotations through said transparent electro-luminescent display;
    selecting at least one handwritten annotation, pressing over said selected annotation with a stylus cooperating with a transparent digitizing tablet superposed on the document;
    computing the coordinates of a point pressed by said stylus;
    comparing said computed coordinates with coordinates of centered points of a handwritten annotations stored in the annotation table;
    identifying and locating in the annotation table the information or service associated with the centered point closer to said computed coordinates of the point pressed by the stylus; and
    accessing said information or service.

11. A system of accessing information or services by touching hyperlinked annotations relating to a physical document, comprising:
    a transparent digitizing tablet;
    a stylus adapted to cooperate with the transparent digitizing tablet in order to select at least one handwritten annotation;
    a transparent electro-luminescent display; and
    a computer system comprising means for retrieving handwritten annotations from an annotation table relating to said physical document and for displaying said handwritten annotation through a transparent electro-luminescent display superposed on said document; means for identifying and locating the information associated with a selected handwritten annotation in the annotation table; means for accessing said information or service; said annotation table comprising for each handwritten annotation, coordinates of a centered point of said handwritten annotation and identification and location of information associated with said handwritten annotation.

12. A system according to claim 11, wherein the transparent digitizing tablet is superposed on the transparent electro-luminescent display.

* * * * *